United States Patent Office 3,383,322
Patented May 14, 1968

3,383,322
CREAMY CLEANSING COMPOSITION
Alta Parker Thomas, Midland, Mich., assignor to The Dow Chemical Company, Midland, Mich., a corporation of Delaware
No Drawing. Filed July 31, 1964, Ser. No. 386,762
3 Claims. (Cl. 252—137)

ABSTRACT OF THE DISCLOSURE

Stable cream-like cleansing composition consisting essentially of water, an aliphatic halohydrocarbon of intermediate boiling temperature, ammonia, alkali, and a water-dispersible cellulose ether.

---

The present invention is concerned with cleaning compositions and is particularly directed to a creamy cleaning composition of which the essential components are five substances. Other substances, if present, are optional and do not pertain to the present invention.

A composition comprising, in mutually potentiating amounts, water, a halohydrocarbon solvent boiling at a temperature not lower than about 30° C., and having molecular weight up to about 180, an alkali metal alkaline compound, and ammonia, when employed in such manner that all components simultaneously exert their effect not only upon soil to be removed but upon one another is a distinctively effective cleansing composition for the loosening of soil of many kinds, with the result that after such loosening the soil can easily be removed by wiping away or rinsing without significant pressure. However, in employing such compositions for the beneficial cleansing effects such compositions produce, difficulty has been encountered in at least two respects. First, it has not always been easy to hold all four components together in order that their effects may be brought to bear simultaneously. Second, it has not always been simple to cause such typically liquid composition to adhere without loss to the lower aspect of a horizontal surface or to a vertical surface. Therefore, it has been desired to prepare compositions of which the essential cleansing action comes from the four said components acting simultaneously, but in some way bound together to achieve the simultaneous action of all components, and in a preparation of viscosity and other properties such that its application to a surface in any position becomes feasible.

Attempts to achieve the desired result in the past have consistently depended upon the employment of amphipathic agents whereby through surface action to effect a single phase system which can be thereafter modified by the addition of viscosity-increasing substances. Typically, wetting agents and the like capable of bringing all four said components into a stable single phase system susceptible of being thickened have been expensive, and quite substantial amounts of them have been necessary to be used. Moreover, the viscosity increasing substances have tended to affect adversely the cleaning efficacy of the cleaning compositions by partially immobilizing portions of active components.

Accordingly, it is an object of the present invention to hold the said four components together as an homogeneous, uniform, relatively viscosus composition of matter, and to do so without inhibiting the efficacy of the composition or any of its components in cleansing, and without introducing undesired side effects such as a staining color, toxicity or the like; and to do so at a minimum cost and with minimum addition of non-cleansing substances of which the effects might be to dilute the four-component cleansing composition and to contribute further dirty solids needing removal. This is accomplished by the use of a creaming agent of which the exact function is not known.

The four components to be employed, together with a creaming agent, may be employed in amounts that vary over substantial ranges. The most abundant single component is typically water. Not a diluent, this substance must be present in substantial amounts, perhaps to permit ionization of inorganic materials, to achieve the cleaning which is the objective of the present invention. Typically, water is present in an amount representing from about 50 to about 90 percent of the entire composition, with from about 55 to about 70 percent being an approximately optimum range.

Typically, the aliphatic halohydrocarbon solvent of molecular weight up to approximately 180 is the second most abundant substance, and is typically present in an amount of from about 5 to about 40 percent by weight of the entire composition; an amount of from approximately 25 to 35 percent by weight is an approximate optimum value. The exact identity of the aliphatic halohydrocarbon solvent does not appear to be critical; the best presently known is dichloromethane which is commercially commonly called "methylene chloride." The second best is believed to be 1,1,1-trichloroethane. Brominated and fluorinated solvents can be used but tend to be susceptible to alkaline hydrolysis and thus are not preferred. The molecular weight limitation of about 180 is not critical, but is intended to indicate that only such solvent substances of relatively moderate to low molecular weight and therefore of fairly high volatility are contemplated. Among such substances, are those set forth in the following table:

| Compound: | Boiling temperature, ° C. |
|---|---|
| Bromochloromethane | 68 |
| Bromochlorodifluoromethane | |
| Bromodichloromethane | 90 |
| Bromodichlorofluoromethane | 51–52 |
| Bromotrichloromethane | 105 |
| Bromotrifluoromethane | |
| Chloroiodomethane | 105–109 |
| Chlorotrifluoromethane | 80 |
| Dibromomethane | 99 |
| Dibromochloromethane | 119 |
| Dichloromethane | 40 |
| Trichlorofluoromethane | 24 |
| Tetrachloromethane | 76.8 |
| Bromoethane | 38 |
| 1-bromochloroethane | 104 |
| 1-bromo-2-chloro-1,1,2-trifluoroethane | 50–53 |
| 2-bromo-2-chloro-1,1,1-trifluoroethane | 50 |
| 1-bromo-1,1-dichloroethane | 98.5 |
| 1-bromo-1,2-dichloroethane | >78 |
| 2-bromo-1,1-dichloroethane | 140 |
| 1-bromo-1,2-dichloro-1,2-difluoroethane | >95 |
| 2-bromo-1,2-dichloro-1,1-difluoroethane | 94 |
| 1-bromo-1-fluoroethane | 41 |
| 1-chloro-2-fluoroethane | 6.52 |
| 1,1-dibromoethane | 106–107 |
| 1,2-dibromoethane | 131.7 |
| 1,1-dichloroethane | 57.3 |
| 1,2-dichloroethane | 83.5 |
| 1,1,2,2-tetrachloroethane | 145.9 |
| 1,1,1,2-tetrachloro-2,2-difluoroethane | 40–41 |
| 1,1,2,2-tetrachloro-1,2-difluoromethane | 91–92.5 |
| 1,1,1-trichloroethane | 74.1 |
| 1,1,2-trichloroethane | 113.7 |

The exact identity of the alkali metal alkaline compound to be employed is not critical. As employed, the substance must be such as to provide a relatively abundant supply of alkali metal ions in the aqueous aspect of the present invention, and to be largely soluble therein, the resulting solutions having a pH appreciably greater than 7. A satisfactory alkali metal alkaline compound in many uses is an alkali metal hydroxide, such as lithium hydroxide, potassium hydroxide, or sodium hydroxide; however, these substances tend to be irritating to human skin and sometimes to be destructive of surfaces which it is desired to cleanse. In these situations, good results are obtained with the somewhat milder alkali metal silicates which are alkali in nature, notably the sodium disilicates, the sodium metasilicates, the sodium metapolysilicates, and the similar compounds wherein the alkali metal is other than sodium. Also, the known alkali metal alkaline cleansing compounds which are phosphatic in nature are satisfactorily employed, including trisodium phosphate, and the numerous polymeric phosphate "glasses" of which many are commercially in the market as cleansing substances. Also, "washing soda," a hydrated sodium carbonate along with the corresponding potassium and lithium compounds, or the same substances supplied in anhydrous form, can be employed. It should be noted that in the present invention ammonia is not the equivalent of an alkali metal compound. Ammonia must be present but its presence does not obviate the critical necessity for the alkali metal alkaline compound.

As present in the instant composition, ammonia may be supplied as a gas, or in the form of an ammonium compound which, by reaction with exces alkali metal alkaline compound releases ammonia in situ. The exact identity of the ammonia source is not critical so long as ammonia is evolved or otherwise supplied in necessary amounts.

The amount of alkali metal alkaline compound to be employed may vary over a substantial range. The satisfactory range is from some point lower than 0.5 weight percent up to at least 10 weight percent. Above 10 weight percent further amounts appear to be unnecessary and may even deleteriously affect the usefulness of the resulting composition. Amounts somewhat lower than one-half weight percent appear to be effective, but the optimum value insofar as is known is somewhere on the order of from 1 to 3 percent, approximately, of such compound. In any event, when an anion is present in the said compound, it may be regarded as a diluent and the amount of compound to be employed may be calculated upon an alkali metal oxide equivalent basis.

The amount of ammonia, similarly, may vary within a substantial range. Typically, the ammonia is believed to be in part associated with the water and the amount that can conveniently be present will vary to some extent according to the amount of water present. In general, an optimum range for the ammonia concentration is from approximately 0.25 to approximately 2 weight percent. Values substantially above and below either of these limits are effective, however.

It would be very desirable if a composition comprising the said ingredients could be presented as a homogeneous, mobile cream. It could be painted onto the surface to be cleansed, permitted to stand until the desired softening or dissolving of soil or other substance had been accomplished, and thereafter simply wiped or rinsed off. However, skilled chemists will recognize the essential incompatibility of the aliphatic halohydrocarbon solvent and the water; and will further recognize the adverse effect of the highly electrolytic alkaline substances present upon typical wetting agents.

The problem of binding the instant substances effectively together in a single viscous or paste-like composition is further complicated by the hydrolytic effect expected to be exerted by the alkali metal alkaline compound upon numerous polymeric materials which would be available in neutral or nearly neutral dispersions. Moreover, ammonia is typically a gas and presents a substantial vapor pressure even in the presence of water; and the aliphatic halohydrocarbon solvent has typically a relatively low boiling point, and, correspondingly, a substantial vapor pressure. It is desired, then, not only to bind the present substances into a unitary composition, but to do so in a manner which prevents the prompt escape as vapor, of substantial proportions of the substances present, without loss of mobility of the composition.

Furthermore, it is desired to achieve the present objectives with the employment of an inexpensive material which is further compatible with such substances as visibility modifying agents such as coloring agents which may be used for aesthetic purposes or to define a treated area, odorant substances, inhibitors intended to prevent the corrosion of contacted surfaces such as metallic surfaces, propellants, and such other incidental and adjuvant substances as may be desired to be added to the instant composition.

According to the present invention I have discovered that the objects of the present invention are achieved, and the composition of the present invention prepared, by the employment as creaming agent of a cellulose ether whereof the etherifying groups are both methyl, yielding a methoxy ether, and hydroxypropyl, yielding a hydroxyisopropoxy ether, there being an approximate average of from 1.08 to 1.61 methoxy and from 0.07 to 0.3 hydroxyisopropoxy moieties per recurring glucose unit in the etherified cellulose chain.

The preparation of the ether product may, and often does, break the original cellulose polymer chain into shorter unit chains. Attempts to determine chain length of cellulose or cellulose derivatives viewed as polymers, or, correspondingly, to determine whole molecular weights of cellulose and its derivatives, have met with only limited success, and highly competent workers have differed as to molecular weights or degrees of polymerization. However, in general, some indication of satisfactory chain lengths can be derived from the fact that cellulose ethers of the above general formula are satisfactory in the present invention over a range in which a 2 weight percent aqueous solution has an Ubbelohde viscosity as measured at 20° C. and in appropriate techniques, of from about 80 to about 18,000 centipoise. References herein to "viscosity" of these substances are made with respect to measurements carried out under the said conditions.

Moreover, chain length of the present creaming agents is believed to be further modified, and probably reduced, during the preparation, by the shearing action that would be expected, and is believed to occur, during a vigorous mixing procedure that is carried out in preparation of the instant compositions.

Because satisfactory results have been achieved using creaming agents of a range of viscosities so great, it is apparent that the creaming together of the present components and particularly the inclusion of the readily volatile components is not a physical entrapment such as might be expected from the mere presence in an aqueous dispersion of a hydrophyllic polymer which created, on the molecular scale, a "log-jam" or "brush-pile" effect. It is believed that some kind of bonding occurs at a bonding energy level lower than that of typical covalent bonding but probably greater than that of hydrogen bonding and that such bonding accounts for the resulting stability of the preparations. This belief is enhanced by the observation that in the preparation of the present compositions some heat was evolved.

It is essential and critical in the present invention that a cellulose derivative of the formula hereinbefore submitted be employed. Many other cellulose derivatives have been tested and have failed. More particularly, water dispersible methoxy cellulose derivatives of great variety but lacking the hydroxyisopropoxy substituents have been tested and none has prepared a composition of the stability necessary to the present invention. Carboxymethyl cellulose derivatives have been employed and have also failed. After extensive testing of numerous substances including many natural thickening agents such as starch, gelatin, and other known thickening substances and a wide variety of synthetically modified cellulose derivatives, it has been determined that only the indicated substances have been satisfactory.

To be a satisfactory product according to the present invention, the resulting composition, comprising the four active cleansing components together with creaming agent, must itself be stable against spontaneous phase-separation as prepared. Moreover, such stability must persist through at least one complete freeze-thaw cycle; the identical sample surviving such freeze-thaw cycle must then withstand centrifugation with an effective radius of at least about 15 centimeters for at least five minutes, at a rotational speed of at least 9,000 degrees per second. Substances surviving these tests are then also tested for a property difficult to define but easy to observe and informally called "spreadability." By this is meant the susceptibility of a substance to be spread more or less uniformly and as a continuous adherent coating upon a surface upon which application is desired. This is deemed to be necessary in order that the cleansing power of the resulting composition be made available with more or less uniformity over a surface from which it is desired to remove a deposited substance. Through the testing of hundreds of candidate compositions it has been ascertained that some, for reasons incompletely known but not correlating directly with viscosity, spread irregularly and leave a deposit with distinct surface features which may be in the nature of "streaks" or "crumbs" or incompletely defined unconnected particles or particles connected by a relatively thin web of deposit, with the result that the distribution, and thereby, the effect of the active components is non-uniform. Only substances which through simple application techniques provided a relatively uniform and smooth deposit were deemed to be acceptable; the persistance of distinct crumbs or brush marks and the like was deemed unsatisfactory.

It was ascertained by observation that certain substances highly satisfactory in all respects exhibited a moderate tendency to segregate into distinct phases upon prolonged standing; only those substances were deemed satisfactory according to the present invention which, upon such separation, could be lightly shaken and upon shaking promptly recombined to attain a homogeneous condition indistinguishable from the original.

Finally, only those substances were deemed satisfactory according to the present invention which, when applied to a standardized thermally degraded food residue soil gave very prompt freeing of the said soil for essentially effortless removal whether by wiping with a damp cloth or by water rinsing under very low pressure.

Several hundred compositions were prepared and examined in the indicated manner, the said compositions being all identical in every respect except for modest variations in concentration of creaming or thickening agent candidate employed and reciprocal modest variations in water content; and in identity of the said creaming agent. Of the said several hundred candidate compositions, only those prepared with, as creaming agent, a modified cellulose ether of exactly the sort hereinbefore described were satisfactory. At one or more of the indicated challenges, all the others failed. Of the compositions prepared with a modified cellulose ether of the sort hereinbefore described, all were satisfactory, independent of the molecular weight as represented by the viscosity of 2 percent solution, of the cellulose ether.

The following examples will enable those skilled in the art to practice the present invention, and embody the best method now known of making and using the present invention.

Example 1

The starting (hydroxyisopropoxy) (methoxy) cellulose ether creaming agent of the sort hereinbefore defined in dry, unmodified form is a white or colorless granular to pulverulent substance, completely dispersible in water but only by appropriate techniques.

300 grams water at room temperature were placed in a 1 liter beaker. Deionized water was used but the absence of ions is not critical. The beaker was positioned under an electrically driven stirrer of which the impeller was approximately centered in the said beaker and near to the bottom thereof. The stirring motor was started and its speed increased to such point that there was formed a well-defined vortex at approximately the center of the water in the said beaker. With the stirring in this situation, there was sprinkled upon the rapidly moving, turbulent upper surface of the said water 15 grams of a (hydroxyisopropoxy) (methoxy) cellulose ether having from approximately 0.07 to approximately 0.3 (hydoxyisopropoxy) moieties per glucose unit and approximately 1.08 to 1.61 (methoxy) moieties per glucose unit. Stirring was continued in the indicated manner for approximately 10 to 15 minutes. Stirring was then discontinued and the resulting dispersion felt between the chemist's fingers. The dispersion was essentially featureless. If a "grainy" undispersed texture is observed in this test, further agitation by stirring of the indicated sort or with a beater employing paired counter-rotating impellers is indicated. Upon completion of the agitation, the resulting dispersion was permitted to stand to allow spontaneous further hydration under kinetic-molecular influences for a period of time; in the present example, overnight. It is essential in the preparation of the present composition that a uniform dispersion of good quality of the cellulose ether in water be first achieved; this is not always easily accomplished. The resulting preparation was a five weight percent dispersion of the cellulose ether in deionized water. Portions of such preparation were used to supply the said ether to further preparatory steps herein.

In the present example, 120 grams of the aqueous cellulose ether dispersion prepared as above described were weighed into a second beaker and combined with 20 grams of aqueous 20 weight percent solution of sodium hydroxide, and 7 grams aqueous 28 weight percent ammonia. The said components were transferred to the jar of a high-speed impeller-type mixing device (Waring Blendor) and blended together for a few seconds to achieve an initial dispersion of all aqueous components. To the resulting viscous aqueous alkaline mixture was then added 60 grams dichloromethane, and the Blendor then operated at high speed (approximately 30,000 revolutions per minute) for 1 minute, with resulting partial shear of the cellulose ether polymer, and creaming together of all components. The resulting mixture was a pearly-white cream, apparently homogeneous, manifested a mild smell of ammonia and of dichloromethane, and was an embodiment of the present invention.

The composition of the present example, upon being first prepared, was placed in a covered container and allowed to stand for a period of time at room temperature and observed, and seen not visibly to separate into phases. It was thereafter immersed in dichloromethane chilled with solid carbon dioxide and in this situation frozen solid. Upon being frozen solid, the composition and container were removed from the freezing bath and permitted slowly to thaw and equilibrate with room temperature. Upon thawing, the composition was examined and no phase separation could be observed. The same sample that had been frozen and thawed was thereafter placed in a centrifuge and spun for 5 minutes at approximately 9,000 degrees per second. At the conclusion of the said centrifugation, the substance was examined and no evidence of phase separation was observed. A portion of the sample that had survived these challenges was then spread with a small brush upon a vitreous surface, and found to spread uniformly, having no observable tendency to form "crumbs" or to leave conspicuous brush marks or other surface feature irregularities.

The said substance was thereafter employed to clean a food residue consisting essentially of heat-degraded fat in the form of a tenaciously adherent brown residue on a vitreous surface. A thin layer of the present composition was spread uniformly over the said resinified fat and permitted to stand for a short time. The resinified fat was thereby so softened and freed that it could be removed quickly and without effort with a sponge wet with room temperature water or, being held under a low pressure stream of water, could be rinsed away without effort.

Essentially the same procedures were repeated, employing as candidate creaming agent, a cellulose ether of essentially identical apparent properties but etherified solely with methoxy groups; the resulting composition was initially distinctively different, and not creamy in appearance; upon standing briefly at room temperature separated into aqueous and organic phases, and was not sufficiently stable to be of value.

In all the examples in the instant invention, an aqueous dispersion of the cellulose ether or other candidate substance in deionized water was first prepared; thereafter, the other substances were added in the indicated order, the alkali metal alkaline compound and the ammonia in water, and, after brief preliminary stirring, the halohydrocarbon solvent followed by vigorous agitation.

In the following examples, the alkali metal alkaline compound was sodium hydroxide and was employed in the amount of two weight percent of the resulting product: ammonia was supplied in the form of 28 weight percent aqueous ammonia and in the amount of one weight percent of actual ammonia in the resulting composition; dichloromethane was supplied in the amount of thirty weight percent of the resulting composition. Water and cellulose ether varied reciprocally as the cellulose ether was employed in amounts from 1.5 to 3 weight percent of the resulting mixture and water in amounts from 54 to 55.5 weight percent of resulting composition.

All survived the indicated challenges of freezing and thawing, centrifugation, and the spreadability test. All were excellent in action to soften and free food residues for easy removal.

The substances employed and the amounts of each were as follows:

Example 2

The creaming agent employed in the amount of 2 weight percent of entire composition in this example was a substituted cellulose ether of which the average recurring heterocyclic polymeric moiety carried from 1.42 to 1.61 methoxy groups and from 0.07 to 0.13 hydroxyisopropoxy groups, of a polymeric chain length such that the substance had a viscosity of 1,500 centipoise. The product was stable to freeze-thaw and centrifugation and, while of a creamy consistency, adhered well to a vertical surface and was an excellent cleaning preparation for removing food residues.

Example 3

In the present example all details were exactly as in Example 1 employing the creaming agent of Example 2 but in the amount of 2.5 weight percent of the resulting composition. Results were as indicated above except that the product was of the consistency of thick cream.

Example 4

The present example duplicated Example 3 except that 3 percent of creaming agent was employed. Results were as these of Example 3 except that the product was of the consistency of very thick cream.

Example 5

The present example essentially duplicated Example 2 except that the creaming agent was employed in the amount of 1.5 weight percent of finished product and had a viscosity of 4,000 centipoise. The resulting product was a pearly white cream, of excellent stability and spreadability and very effective as a cleansing agent for resinified fats.

Example 6

This example duplicated Example 5 except that 2 weight percent of creaming agent was employed. The product was much like that of Example 6 but of a thicker consistency.

Example 7

This example duplicated Example 5 except that 2.5 weight percent of creaming agent were employed. The resulting product closely resembled that of Examples 5 and 6 except that it was heavier in consistency.

Example 8

The present example essentially duplicated Example 2 except that the creaming agent employed in the amount of 2.5 weight percent of entire composition was a substituted cellulose ether of which the average recurring heterocyclic polymeric moiety carried from 1.08 to 1.42 methoxy groups and from 0.1 to 0.3 hydroxyisopropoxy groups, and of a viscosity of 100 centipoise. The product was stable and had excellent cleansing properties.

Example 9

The present example essentially duplicated Example 8 except that the polymer chain length of the creaming agent gave it a viscosity of 400 centipoise. The product was a heavy cream and of excellent cleansing properties.

Example 10

The present example duplicated Example 8 except that 3 percent of creaming agent was employed. The product was a heavy, pearly cream of excellent cleansing properties.

Example 11

The present example duplicated Example 9 except that the creaming agent tested as indicated gave a viscosity of 4,000 centipoise. The product was a heavy, pearly cream and was highly effective to remove resinified fat.

Example 12

The present example duplicated Example 11 except that 2 percent of creaming agent was employed and the agent gave a viscosity, when tested as indicated, of 8,000 centipoise. The product was a pearly cream and highly effective in cleansing food residues.

Example 13

The present example duplicated Example 12 except that 2.5 percent of creaming agent were employed. The product was excellent by the hereinbefore described criteria.

Several hundred preparations were made, employing as creaming agents variously, by techniques meant to exhibit optimum properties of each, gelatinized starches from corn (*Zea mays*), tapioca, and arrowroot; gelatin; eight different commercial carboxymethyl cellulose derivatives; agar agar, gum arabic, gum karaya, and a glycol-alkanolamine sulfonated polyvinyltoluene thickener system. Each was tested over a range of probable candidate creaming agent concentrations, several hundred being tested in all. Of all of the preparations thus made, only those hereinbefore described were deemed to be in all particulars satisfactory.

The most common failure in those that failed was separation into aqueous and organic phases, before or after freezing. Some failed by exaggerated syneresis. A few were not spreadable but fractured rather than spread.

It was ascertained that there were highly significant differences in cleansing power between preparations identical, or nearly so, in composition, except differing essentially only in identity of creaming agent. There appeared also to be important differences in vapor pressure from the various preparations. Those presently claimed seemed uniformly to manifest less odor of ammonia and dichloromethane than did those of less satisfactory performance.

"Cream" and "creamy" as used herein are used in analogy to fluid cream separated from cow's milk, and describe a substance of incompletely known structure that appears to be in the nature of a colloid, as is cream.

The creaming agents to be employed according to the present specification and claims are prepared by reacting cellulose with an aqueous alkali metal hydroxide to obtain an alkali cellulose and thereafter reacting the alkali cellulose with methyl chloride when it is desired to introduce methoxy groups or with propylene oxide

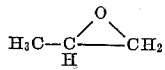

when it is desired to introduce hydroxyisopropoxy groups. Control of the relative supply of each substituent-supplying reactant controls the relative degree of substitution by each. Control of the duration and temperature of treatment of starting cellulose with aqueous alkali metal hydroxide controls product chain length and thus controls viscosity of product as measured in standardized product solutions.

I claim:

1. Cream-like products stable through at least one freeze-thaw cycle and through at least 5 minutes' centrifugation at 9,000 degrees per second, consisting essentially, in weight parts by weight of total of 100 parts of composition, of from about 50 to about 90 parts water; from about 5 to about 40 parts of an aliphatic halohydrocarbon solvent boiling at a temperature not lower than about 30° C., and of molecular weight up to about 180; from about 0.25 to about 2 parts of ammonia; from about 0.5 to about ten parts of an alkali metal alkaline compound that is a hydroxide, a silicate, a phosphate, or a carbonate; and a cellulose ether etherified with from about 0.07 to about 0.3 (hydroxyisopropoxy) and from about 1.08 to about 1.61 (methoxy) moieties per glucose unit, in an amount sufficient to permit formation of the said cream-like product.

2. Composition composed in parts by weight, approximately, of 30 parts dichloromethane, 2 parts sodium hydroxide, one part ammonia, 2.5 parts of a (hydroxyisopropoxy) (methoxy) cellulose ether having from approximately 0.07 to approximately 0.3 (hydroxyisopropoxy) moieties per glucose unit and approximately 1.08 to 1.61 (methoxy) moieties per glucose unit; and water sufficient to make 100 parts.

3. Composition composed, in parts by weight, approximately, of 30 parts dichloromethane, 2 parts sodium hydroxide, 1 part ammonia, 2 parts of a (hydroxyisopropoxy) (methoxy) cellulose ether having from approximately 0.07 to approximately 0.13 (hydroxyisopropoxy) moietes per glucose unit and approximately 1.42 to 1.61 (methoxy) moietes per glucose unit; and water sufficient to make 100 parts.

References Cited
UNITED STATES PATENTS 2,827,439   3/1958   Helper et al. _____ 252—159

FOREIGN PATENTS 1,326,539   4/1963   France.

OTHER REFERENCES

The Federal Register (25), 8949 (Sept. 17, 1960).

LEON D. ROSDOL, *Primary Examiner.*

B. BETTIS, *Assistant Examiner.*